Oct. 6, 1964     W. A. HENSLEY, JR     3,152,307
TUNING FORK FREQUENCY GENERATOR
Filed Jan. 25, 1960
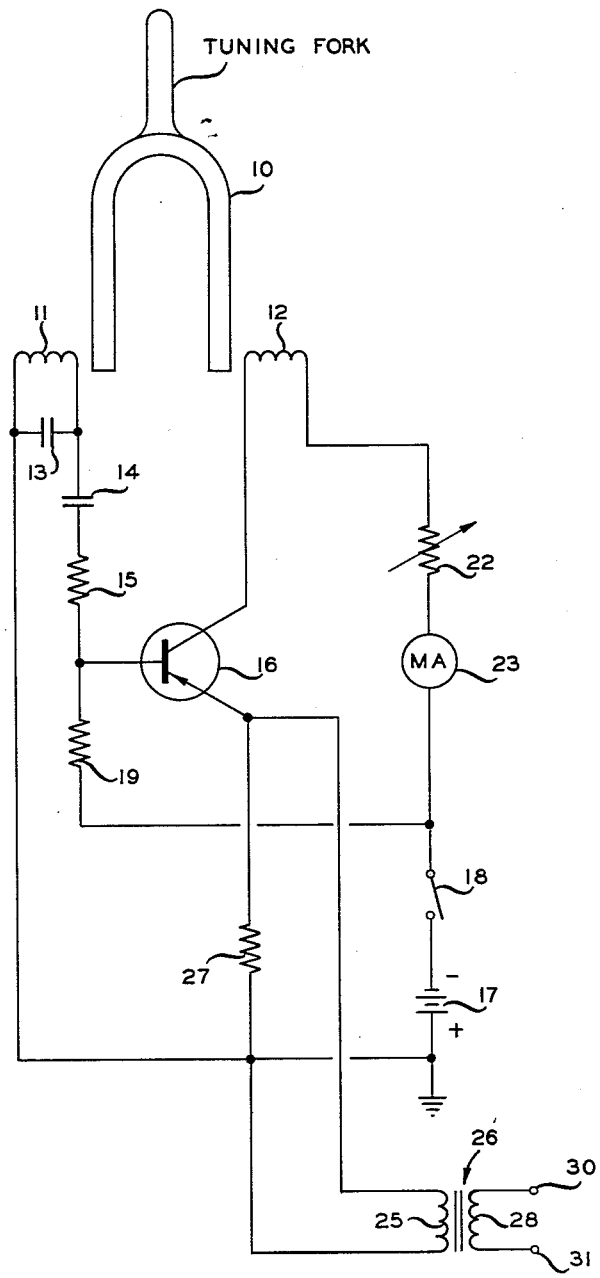
INVENTOR.
W. A. HENSLEY JR.
BY Hudson & Young
ATTORNEYS United States Patent Office 3,152,307
Patented Oct. 6, 1964

3,152,307
TUNING FORK FREQUENCY GENERATOR
William A. Hensley, Jr., Bartlesville, Okla., assignor to Phillips Petroleum Company, a corporation of Delaware
Filed Jan. 25, 1960, Ser. No. 4,395
4 Claims. (Cl. 331—116)

This invention relates to apparatus for generating electrical signals of predetermined frequency.

There are a number of industrial and laboratory applications for constant frequency signal generators. For example, it is often desirable to apply timing signals to recorders in addition to the information to be recorded so that the times of occurrence of selected features can be observed. Such timing signals are commonly applied to records made from seismometers employed in geophysical prospecting so that the times of occurrence of reflected seismic signals can be measured. These timing signals usually are obtained from electrical signal generators which are controlled by tuning forks of predetermined frequency. In order to be assured of accurate timing signals, it is desirable to test the frequency of these tuning forks periodically.

In accordance with the present invention there is provided a novel electrical signal generator which establishes output signals of constant predetermined frequency. This signal generator comprises an oscillator which is advantageously formed by a single transistor and a tuning fork. A driving coil and a signal coil are associated with the respective arms of the tuning fork so that vibrations imparted to the fork from the driving coil result in voltages being induced across the signal coil. These induced voltages are fed back to the input of the oscillator so as to sustain oscillations. It is desirable that the tuning fork be temperature compensated so that the output frequency does not fluctuate with changes in temperature. The oscillator circuit of this invention establishes output electrical signals of constant frequency. These signals can be employed to test other signal generators, or to establish accurate timing signals.

Accordingly, it is an object of this invention to provide apparatus for generating electrical signals of predetermined frequency.

Another object is to provide portable equipment for testing the accuracy of electrical signal generators.

Other objects, advantages and features of the invention should become apparent from the following detailed description, taken in conjunction with the accompanying drawing which is a schematic representation of the signal generator of this invention.

Referring now to the drawing in detail, there is shown a tuning fork 10 which is adapted to vibrate at a predetermined frequency. It is desirable that this tuning fork be temperature compensated so that the natural frequency of vibration does not change with changes in temperature. This can be accomplished by constructing the fork of two or more metals having different temperature coefficients of thermal expansion so that the effective dimensions of the tuning fork remain constant despite changes in temperature. A driving coil 12 is positioned adjacent one of the arms of the tuning fork and a signal coil 11 is positioned adjacent the other arm. These coils are positioned with respect to the fork so that a surge of current through either coil sets the fork in vibration to induce a signal in the other coil.

A capacitor 13 is connected in parallel with signal coil 11 to form a tank circuit which is tuned to the frequency of fork 10. One terminal of capacitor 13 is connected through a blocking capacitor 14 and a resistor 15 to the base of a PNP transistor 16. The grounded positive terminal of a current source 17 is connected to the second terminal of capacitor 13. The negative terminal of current source 17 is connected through a switch 18 and a resistor 19 to the base of transistor 16. If a NPN transistor is employed, the polarity of current source 17 is reversed.

The first terminal of driving coil 12 is connected to the collector of transistor 16. The second terminal of coil 12 is connected through a variable resistor 22 and a milliammeter 23 to the junction between switch 18 and resistor 19. The emitter of transistor 16 is connected to ground through the primary winding 25 of a transformer 26. A resistor 27 is connected between the emitter of transistor 16 and ground. The secondary winding 28 of transformer 26 is connected to output terminals 30 and 31.

In one specific example of the signal generator of this invention, the following circuit components were employed:

| Element: | Value |
|---|---|
| 15 | 18,000 ohms. |
| 19 | 240,000 ohms. |
| 22 | 10,000 ohms. |
| 27 | 1,000 ohms. |
| 11 | 1,800 ohms. |
| 12 | 1,800 ohms. |
| 25 | 500 ohms. |
| 13 | 0.1 microfarad. |
| 14 | 10 microfarads. |
| 17 | 7.5 volts. |
| 10 | Tuned to vibrate at 100 cycles/second. |

Switch 18 is closed to energize the oscillator formed by the illustrated apparatus. This results in an initial surge of current through coil 12 which sets tuning fork 10 in vibration at its natural frequency of 100 cycles per second. The resulting vibrations induce a signal in coil 11. A portion of the signal induced in coil 11 is fed back to the input base circuit of the transistor so as to maintain vibrations in tuning fork 10. This action continues so that vibrations of increased amplitude are slowly built up for a period of several minutes. The output signal is taken across resistor 27 and applied through transformer 26 to terminals 30 and 31. The collector current is maintained constant at a preselected value by suitable adjustment of variable resistor 22. This serves to compensate for any temperature fluctuations which influence the operation of transistor 16. It has been found that with such constant current in the collector circuit, the output frequency has an accuracy as great as one part in 180,000.

As previously mentioned, the output signal from the signal generator of this invention can advantageously be employed to check the frequency of other signal generators. This can readily be accomplished by comparing the signals of the generators through the use of an oscilloscope, for example. However, the output signal of this generator can also be employed directly as a source of timing signals in any suitable equipment. An important advantage of this invention resides in the simplicity of the circuit and the fact that a portable signal generator of small size can be constructed.

While the invention has been described in conjunction with a present preferred embodiment, it should be evident that it is not limited thereto.

What is claimed is:

1. A signal generator comprising a tuning fork adapted to vibrate at a predetermined frequency; first and second coils positioned adjacent respective arms of said fork so that a fluctuating electrical signal in said first coil establishes vibration in said fork to induce a fluctuating electrical signal in said second coil; a transistor having a base, a collector, and an emitter; a current source; a first resistor connected between the first terminal of said current source and said base; means connecting the first terminal of said second coil to the second terminal of said current source; a first capacitor and a second resistor connected in series between the second terminal of said second coil and said base; a second capacitor connected in parallel with said second coil to form a tank circuit tuned to the frequency of said fork; a third resistor connected between said second terminal of said current source and said emitter; an output transformer having the primary winding thereof connected across said third resistor; means for connecting the first terminal of said first coil to said collector; and means connected between the second terminal of said first coil and said first terminal of said current source to maintain said collector current substantially constant.

2. The signal generator of claim 1 wherein said last-mentioned means comprises a variable resistor and a current meter connected in series relationship.

3. The signal generator of claim 1 wherein said transistor is a PNP transistor and said first terminal of said current source is negative.

4. The signal generator of claim 1 wherein said fork is constructed of at least two metals having different temperature coefficients of thermal expansion so that the natural frequency of vibration of said fork remains substantially constant despite changes in temperature.

References Cited in the file of this patent

UNITED STATES PATENTS

| 1,976,384 | Braman | Oct. 9, 1934 |
| 1,979,296 | Sweeney | Nov. 6, 1934 |
| 2,547,027 | Winkler | Apr. 3, 1951 |

FOREIGN PATENTS

| 418,429 | Great Britain | Oct. 24, 1934 |

OTHER REFERENCES

Kretzman: Electronics, Feb. 1, 1957, pages 196 to 204.
RCA Technical Note 133, received March 12, 1958.